United States Patent
Ditcharo et al.

(10) Patent No.: US 7,617,248 B2
(45) Date of Patent: Nov. 10, 2009

(54) NOTIFICATION SYSTEM AND METHOD

(75) Inventors: Patricia Ditcharo, Atlanta, GA (US); James S. Wheeler, Lithonia, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 442 days.

(21) Appl. No.: 10/422,815

(22) Filed: Apr. 25, 2003

(65) Prior Publication Data

US 2004/0024789 A1  Feb. 5, 2004

(51) Int. Cl.
 *G06F 17/00* (2006.01)
(52) U.S. Cl. ........................ 707/200; 707/100; 707/102; 707/104.1
(58) Field of Classification Search ........................ 707/1, 707/2, 10, 200, 100–102, 104.1
See application file for complete search history.

(56) References Cited

U.S. PATENT DOCUMENTS

| | | | |
|---|---|---|---|
| 5,093,794 A * | 3/1992 | Howie et al. ................ 700/100 |
| 5,289,368 A * | 2/1994 | Jordan et al. ................... 705/8 |
| 5,343,387 A * | 8/1994 | Honma et al. .................. 705/9 |
| 5,610,969 A | 3/1997 | McHenry et al. | |
| 5,705,980 A * | 1/1998 | Shapiro ................. 340/539.11 |
| 5,711,011 A | 1/1998 | Urs et al. | |
| 5,767,848 A | 6/1998 | Matsuzaki et al. | |
| 5,786,550 A * | 7/1998 | Thangavelu ................. 187/386 |
| 5,907,829 A * | 5/1999 | Kida .............................. 705/9 |
| 5,943,652 A * | 8/1999 | Sisley et al. .................... 705/9 |
| 6,088,648 A * | 7/2000 | Shah et al. ................... 701/117 |
| 6,212,393 B1 * | 4/2001 | Suarez et al. ............. 455/456.4 |
| 6,263,209 B1 | 7/2001 | Reed et al. | |
| 6,308,216 B1 | 10/2001 | Goldszmidt et al. | |
| 6,356,875 B1 * | 3/2002 | Green et al. .................... 705/9 |
| 6,463,585 B1 * | 10/2002 | Hendricks et al. ............. 725/35 |

* cited by examiner

*Primary Examiner*—Sana Al-Hashemi
(74) *Attorney, Agent, or Firm*—Scott P. Zimmerman, PLLC

(57) ABSTRACT

A dispatch and notification system that can adjust resources to meet and accommodate real time changes in demand or load is disclosed. The system provides an automated assembly that includes provisions that provide an effective and low cost arrangement that notifies technicians of real time changes in their scheduled work. The system can determine if a real time intervention in a technician's schedule is necessary and can notify the technician in near real time of changes in assigned tasks.

14 Claims, 2 Drawing Sheets

NOTIFICATION SYSTEM AND METHOD

This application claims priority from U.S. patent application Ser. No. 09/468,930, filed Dec. 22,1999.

BACKGROUND

1. Field of the Invention

The present invention is directed to a system and method for notifying and dispatching employees. The notification system and method of the present invention may also be used as an accessory or addition to existing dispatch systems.

2. Background of the Invention

Existing employee dispatch systems and methods include either a dispatcher (a person who receives and processes requests for services), or an automated dispatch system. These existing dispatch systems suffer from shortcomings and limitations that significantly detract from their usefulness and their efficient management of resources.

The limitations of current dispatch systems can be demonstrated by considering an example of a large public utility, such as a local telephone company that provides telephone services. Local telephone companies typically have tens of millions of customers, and those customers request new services or changes in services. These requests require the telephone company to dispatch technicians to service locations to make the requested changes in service.

On average, a local telephone company will make two and a half to three million service order dispatches per year. Generally, the productivity per task is about 2 hours, in other words, the requests for service generally take 2 hours to resolve. With this level of productivity, the local telephone company can only assign around four items per day per technician. Thus each truck dispatch is extremely costly to the local telephone company. It therefore becomes imperative that each dispatch is effective, i.e., each dispatch either actually resolves the problem or obtains information needed to resolve the problem.

Conventional automated dispatch systems very often assign tasks on a first-come, first-serve basis to the first available technician. As a technician completes or close out a job, the next job in the queue is automatically assigned to that technician. Occasionally, by happenstance, this first-come first-serve priority system would produce efficiencies where a second job would come to the technician after the first job was completed and the second job would happen to be in the same location as the first job. This would allow the technician to quickly complete a second job without having to drive to another location. Unfortunately, these efficiencies seldom occur and then only by pure chance. Oftentimes, in fact, that was not the case, and it would be very likely that a technician would leave the first location to travel to the next job site and a second technician would drive up to that first location to complete a second job there.

Moreover, in some cases a single problem causes multiple customers to lose service or experience poor service. For example, damage to pedestals that provide telephone service to multiple customers could cause several customers to report problems or loss of service. The pedestal often is located on the side of the road and provides a connection between a customer's location and serving centers. These pedestals are subject to damage, for example, from cars or even from state highway mowers. When damage to these pedestals occurs, the result is often that multiple outages occur in one locality. Generally, conventional reporting and dispatch systems address this problem by setting a certain tolerance threshold to indicate a probable common problem. For example, if the threshold were set at five, the system would require five or more similar complaints or reports of problems received from a common location to assume that a common problem was causing all of the problems reported by customers. If that threshold number of complaints or reports were met, then only a single technician would be dispatched to resolve the problem.

However, in those cases where the threshold for a system wide or regional problem is not met, as many (in the example provided above) as four technicians may be deployed to a single site causing enormous waste of resources and extreme expense to the company.

Also, customers often cancel appointments or request a modification in service. Sometimes these changes can occur at the last minute and existing systems have no way of informing the technician of these changes. These cancellations and modifications also waste technician resources, because technicians waste time waiting for customers or are required to return to the same location to make the modifications in service that the customer later requested.

Another source of ineffective use of technician resources is the lack of knowledge of customer service representatives. These representatives often lack an understanding of the costs associated with technician deployment and of the logistical complexities of managing and assigning a large number of technicians. They are generally trained to meet the customer's needs and to generate service orders. However, customer service representatives may occasionally create two different service orders for related or similar tasks. This could cause two dispatches to be generated and result in two technicians being deployed to the same location to fix what the service representative thinks are two different problems, but is instead only a single problem that could be handled by a single technician.

Dispatch systems that use a human dispatcher may permit real time modification of tasks and assignments. However, these dispatch systems, generally employed by taxicab companies, suffer significant drawbacks that would prevent them from being employed in large-scale environments. These dispatcher-based dispatch systems rely on a human dispatcher who is given information regarding demand (customers that need rides). The dispatcher uses this information combined with his or her knowledge of where all of the cabs are to assign the customer pick up to the nearest available cab. First, these dispatch systems are very expensive because a staff of well trained dispatchers are required to work around the clock, 24 hours a day, to match resources with demand. Second, the dispatcher-based systems are not practical for large-scale deployment because human dispatchers cannot accurately track hundreds, much less thousands, of technicians and their daily assignments. Finally, human dispatcher-based systems rely heavily dependent on the performance of the dispatcher or the dispatcher staff. Human error may produce an unacceptable level of errors.

Thus there is currently a need for a system that accommodates real time or near real time changes in load or demand by adjusting or reallocating resources to meet those changing needs. There is also need for such a system that is also automated, can handle a large number of technicians and requests for services, and inexpensively delivers information to the technician.

SUMMARY OF THE INVENTION

The present invention is designed to overcome the shortcomings of the prior art and to provide an effective and efficient dispatching system that can adjust resources to meet and accommodate real time changes in demand or load. The invention provides a system that notifies technicians of real time changes in their scheduled work. The system can determine if a real time intervention in a technician's schedule is necessary and can notify the technician in near real time of changes in assigned tasks. In this way, the invention adjusts the allocation of resources to meet real time changes in demand.

Once a technician has been dispatched to complete a task, the system monitors cancellations and changes that may be requested by the customer for that task. The system sends information to adjust the assignment of the technician to efficiently utilize the technician's time in situations where the customer has requested late or last minute cancellations or changes.

The system allows real time or near real time instructions to be sent to the technician. These instructions can include changes or modifications to the task assigned to the technician. The instructions can also include notices that the task has been canceled, or that the technician should complete the assigned task and then remain at that location to receive the next assignment.

The invention may include a system that considers the following information in determining if a real time intervention is necessary: information regarding the work history of the technician or the number of hours the technician has worked in a pay period, including the number of overtime hours, the availability of the technician, the qualifications of the technician, and the suitable locations where the technician is most beneficially dispatched.

An object of the present invention is to reduce or eliminate the inefficient use of technicians.

Another object of the present invention is to maximize the utilization of technicians.

Another object of the present invention is to provide a system that adjusts and reallocates resources to meet real time changes in load or demand.

Another object of the present invention is to provide real time or near real time information to a technician regarding the status of his assignments.

Additional features and advantages of the invention well be set forth in the description which follows, and in part will be apparent from the description, or may be learned by practicing the invention. The objectives and other advantages of the invention will be realized and attained by the structure particularly pointed out in the written description and claims as well as the appended drawings.

DETAILED DESCRIPTION OF THE INVENTION

Figure 1:
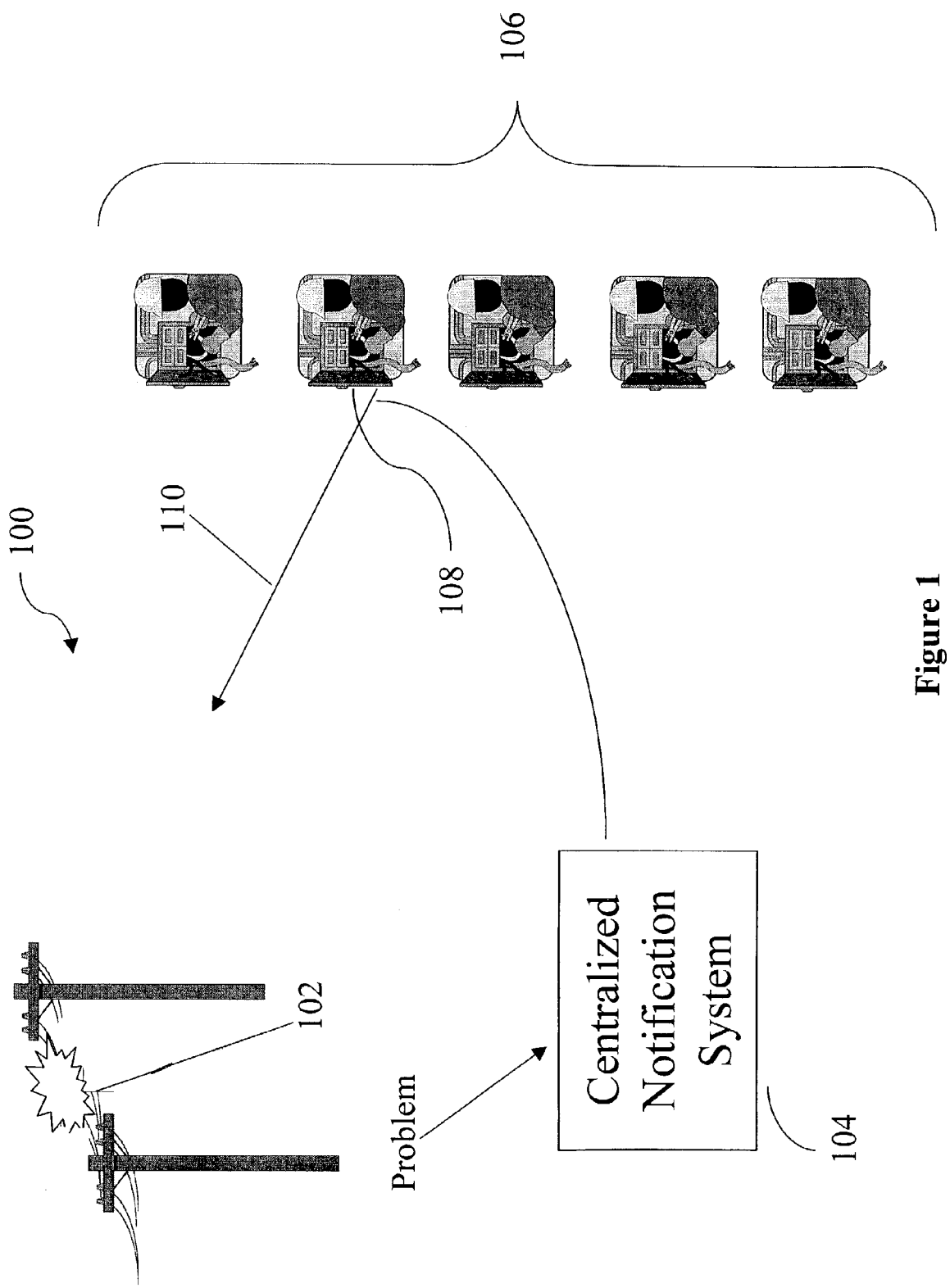
FIG. 1 is a schematic diagram of a preferred embodiment of the present invention.

FIG. 1 shows a schematic representation of a preferred embodiment of the present invention. When a problem 102 arises and is reported to a notification system 104, according to the present invention, notification system 104 reviews the qualifications of a number of technicians 106, and selects the most suitable technician 108 to dispatch to the problem 102.

Once the suitable technician 108 has been dispatched or is en route 110 to the problem, the invention allows real time or near real time instructions to be sent to the technician. These instructions can include changes or modifications to the task assigned to the technician 108. Preferably, those instructions also include notices that the task technician 108 is currently heading towards has been canceled, or that the technician should complete the assigned task and then remain at that location to receive the next assignment.

In a preferred embodiment, the system 104 includes information regarding the work history of the technician or the number of hours the technician has worked in a pay period, including the number of overtime hours, the availability of the technician, the qualifications of the technician, and suitable locations to which the technician is most beneficially dispatched. In addition to considering all of these factors in deciding to send information to the technician 108, the system 104 also monitors problem information and requests for service sent to the system by customers and customer service representatives. The system 104 analyzes requests for modifications to existing assignments and determines if a real time intervention is required. If a real time intervention is required, the system 104 sends a message to the technician 108 and informs the technician 108 of that information.

Figure 2:
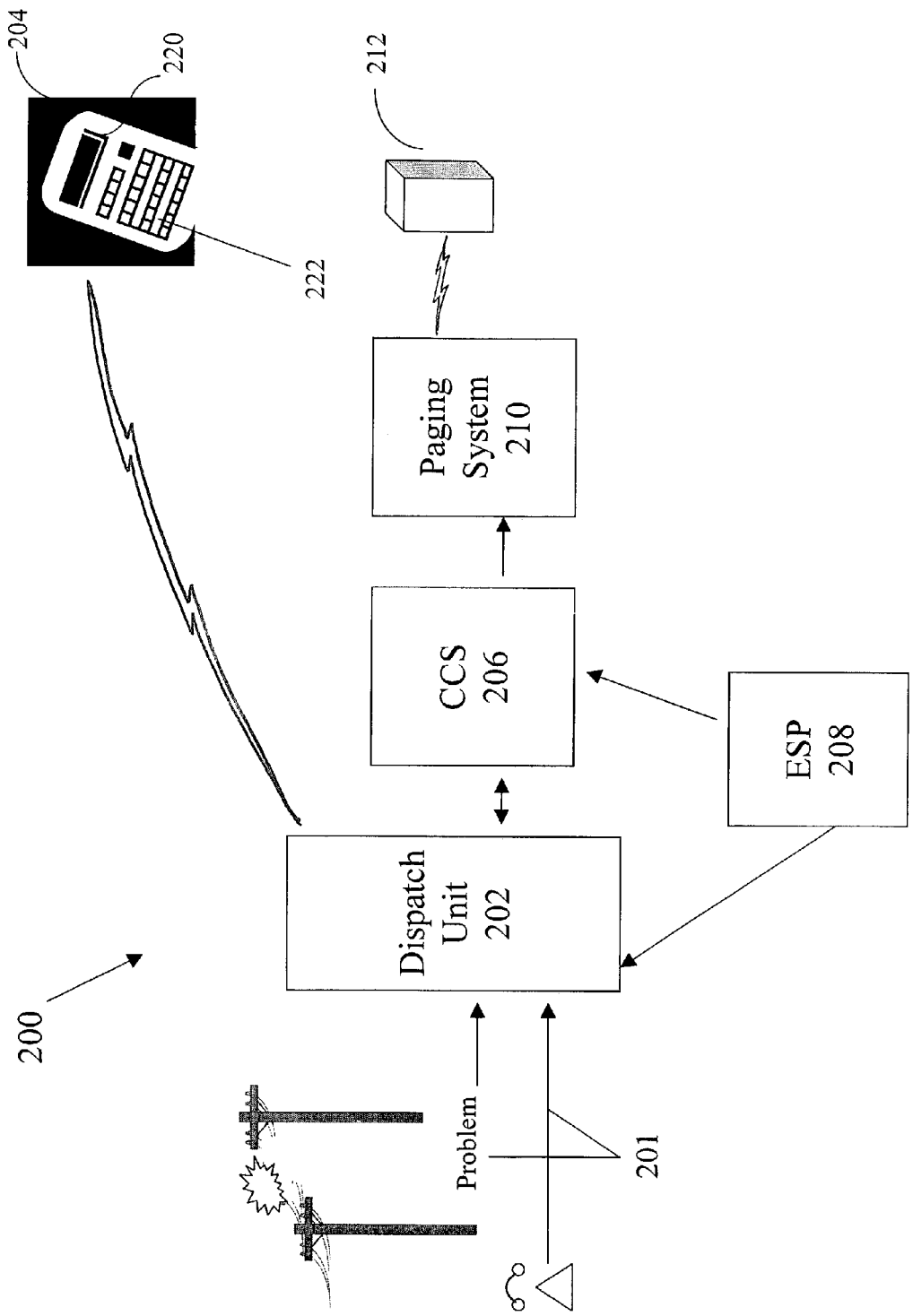
FIG. 2 is a schematic diagram of another preferred embodiment of the present invention.

FIG. 2 is a preferred embodiment of the present invention in which various components have been assembled and linked together to provide a notification system 200. The notification system 200 includes a dispatch unit 202, a centralized call-out system (CCS) 206, an employee scheduling program (ESP) 208 and a paging system 210. The system 200 can communicate with various other devices, for example, an access unit 204 via access system 203 and pagers 212 via paging system 210.

The dispatch unit 202 serves several functions. Dispatch unit 202, according to this embodiment, receives information 201 about problems or requests for service from customers directly or through customer service representatives. These problems could include reports of downed lines, loss of service, poor service and other problems that affect the services rendered. Examples of requests for service include requests to modify or change the services rendered. In the specific context of a local telephone company, this could include requests to add additional telephone lines, to add DSL lines, to install additional telephone jacks, and other types of service. Preferably, the dispatch unit 202 receives information regarding problems or requests for service through customer service representatives who complete an interactive computerized form. Preferably, this information, which may include the customer's name, address, telephone number, billing information, and nature of problem, is communicated to the dispatch system 202 when a technician intervention is required.

Dispatch unit 202 communicates with one or more access units 204 via an access system 203. The access system 203, which is capable of wireless or wireline communications with access units 204, also communicates with dispatch unit 202. The access system 203 conveys information from the access units 204 to dispatch unit 202. In an exemplary embodiment of the present invention, the Tech Plus system is used as the access system 203. The Tech Plus system is disclosed in U.S. patent application Ser. No. 09/343,815, which is assigned to the same assignee as the present application, and is incorporated by reference herein. The access units 204 are preferably each associated with a technician. Preferably, each technician is assigned an access unit 204 and can use the access unit 204 to communicate with the dispatch unit 202. For purposes of clarity, this disclosure will describe a single access unit 204, but it should be kept in mind that many other access units 204 may be in communication with dispatch unit 202. Dispatch unit 202 sends information regarding work assignments to the access unit 204 via access system 203, which is capable of wireless or wireline communication with access unit 204. In an exemplary embodiment of the invention, the dispatch system 202 is an LMOS™ (Loop Maintenance Operating System) created by Lucent Technologies.

Dispatch system 202 sends assignment information to access unit 204 via access system 203 and technicians use access unit 204 to retrieve assignment information. Access unit 204 is preferably equipped with a display 220 and an input portion 222. Preferably, only one assignment is sent to the access unit 204 at a time and a second assignment is only sent after the first assignment has been completed or closed by the technician. Access unit 204 may also include provisions that allow technicians to retrieve infrastructure information. For example, in the context of a local telephone company, infrastructure information could include the number of lead pairs available to a particular location, the number of switches available and other information related to infrastructure. Access unit 204 may also include provisions that allow technicians to run tests on the customer's equipment.

The employee scheduling program (ESP) 208 communicates with dispatch unit 202 and centralized call-out system (CCS) 206. ESP 208 contains a database that associates each technician with an employee or technician number and a system number. Preferably, the system number is an LMOS™ system number. The use of a system number is optional, but may be helpful where systems allow only three digit employee numbers and those same employee numbers must be used over again for different employees in different regions. Adding a regional designation or a system number allows each employee to have a unique identification. ESP 208 also includes a detailed database that contains schedule information for some or all of the technicians. ESP 208 preferably stores the scheduling information for all or some of the technicians for up to one year. Maintenance personnel preferably maintain, enter, and modify the schedules of technicians using the ESP 208.

ESP 208 provides information regarding the availability of technicians to dispatch unit 202. Preferably, ESP 208 provides technician numbers, system numbers, and scheduling information to dispatch unit 202. The dispatch unit 202 preferably stores a detailed, but shorter time span of information regarding scheduling. While the preferred ESP may store a year of scheduling information, the preferred dispatch unit 202 may store only about three to five days of scheduling information. In addition to providing information to dispatch unit 202, ESP 208 also provides information to CCS 206. Preferably, ESP 208 provides technician numbers, system numbers, and scheduling information to CCS 206.

Once CCS 206 receives information from ESP 208, CCS 206 constructs a table or database that includes technician numbers, system numbers, pager numbers, and pager types. The pager numbers and pager types that are carried by the technicians are stored in CCS 206, and CCS 206 associates these pager numbers and pager types with the additional information sent to it by ESP 208. The pager numbers are associated with pagers worn or carried by technicians. CCS 206 is in communication with both the dispatch unit 202 and a paging system 210.

In order to maximize the efficient use of resources, namely, the technicians and their time, the system 200 can dynamically adjust technician deployment to accommodate real time changes in load or demand for services. Notification system 200 accomplishes this by rapidly notifying technicians of information that could affect their work schedule as soon as possible, and by diverting technicians away from inefficient situations to locations where their talents and skills will be more effectively utilized. These notices to technicians can occur in near real time and even during the critical period after the technician has been dispatched to a job site.

In order to accomplish this near real time adjustment in technician deployment, system 200 preferably uses a number of different components. The following example of an adjustment demonstrates how system 200 can dynamically adjust technician deployment in near real time.

Initially, dispatch unit 202 is functioning in its normal routine. It receives problems or requests for service 201, matches technicians based on the factors mentioned above, then transmits tasks and assignments to access unit 204 via access system 203. As noted above, the dispatch unit 202 may assign tasks in any suitable manner. However, the preferred method of assignment considers several factors including commitment dates and time, severity of the outage, the revenue generated by the service order, and the availability of a close-by technician. Technicians are preferably assigned based upon geographic regions, which are areas bound by natural geographic barriers. Technicians who are geographically located closer to the task being the preferred dispatch technician. The technicians read the tasks and drive to those destinations to make the necessary repairs or changes in service. Occasionally, dispatch unit 202 will retrieve additional information from the ESP 208 and update its technician work schedules.

Dynamic adjustments occur when dispatch unit 202 is notified of a modification or change to a technician's schedule, or learns of a situation that could result in more efficient use of resources. Customers sometimes call their customer service representatives to notify them that they need to cancel, postpone or change a work request they had previously submitted. When this occurs, the customer service representative relays the information to dispatch unit 202.

When the dispatch unit 202 receives the notification that a work request has been changed or modified, the dispatch unit 202 determines if an intervention by CCS 206 would be helpful. Any desired situation or condition that helps to prevent waste of technician resources or maximize technician utilization may be used by the dispatch unit 202 to determine if a CCS 206 intervention would be helpful.

Preferably, a condition where a technician has already been dispatched to a job site to an assigned task combined with a request for modification of that task is the condition used to determine a CCS 206 intervention. After dispatch unit 202 has determined that a CCS 206 intervention would be helpful, dispatch unit 202 communicates appropriate information to CCS 206 so that CCS 206 can provide real time adjustment information to the technician. Preferably, dispatch unit 202 communicates geographic information, that is, where in the service region the technician must go to respond to the request and where the technician is located or assigned; information associated with the technician, like the employee number and the technician's system number; and information related to the modification or change in schedule or task.

This information is used by CCS 206 to determine which technician should receive the information and what information that technician should receive. Once the identity of the technician and the adjustment information to be sent to the technician has been determined, CCS 206 communicates this information to a paging system 210. Preferably, the information communicated to the paging system 210 includes the technician's pager number and an information code. CCS 206 can also preferably send a text message, if the technician's pager is capable of receiving text messages.

The paging system 210 receives the information from CCS 206 and sends a page to the technician's pager 212. After the technician has been paged, the technician can review the information displayed on pager 212 and act accordingly.

Some of the preferred messages that are sent to technicians include codes that inform the technicians that a job has been canceled or modified. Another code that can be sent to the technician informs the technician that the next job will be at the same or nearby location. In essence, this code is a "remain where you are and standby for the next job" command. Obviously, if a customer wants to cancel a previously scheduled service order, the cancel code will be transmitted. Similarly, if a customer wants to change or modify a previously scheduled service order, the change or modify code will be transmitted to the technician. When the technician receives the change or modify code, the technician is preferably trained to retrieve the new job from the access system 204. Finally, if the system 200 determines that it would be beneficial for the technician to remain at a certain location after a job has been completed, the remain code will be transmitted. In an exemplary embodiment of the present invention, the cancel code is 333, the modify or change code is 444 and the remain code is 555.

Any of the various components or sub-steps disclosed above can be used either alone, or with other existing components, or with components or features of the present invention.

It will be apparent to those skilled in the art that various modifications and variations can be made to the dynamic carrier selection system of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for dispatching technicians, comprising:
   (a) a dispatch unit receiving request for service; and
   (b) a plurality of access units in communication with the dispatch unit, each access plurality of access units associated with each of a plurality of technicians, each access unit providing access to information related to an infrastructure, and each access unit allowing each of the plurality of technicians to run tests on a customer's equipment,
   the dispatch unit receiving a request for service from a customer, generating an assignment having a plurality of attributes associated with the request, comparing the plurality of attributes associated with the request with a plurality of qualifications associated with the each of the plurality of technicians, selecting a technician based upon a matching of attributes and qualifications and proximity to a location of the request for service, sending the assignment to the selected technician, the assignment instructing the selected technician to perform the requested service, and the dispatch unit monitoring a cancellation by the customer of the request for service, and the dispatch unit notifying the selected technician in real-time of the cancellation.

2. The system of claim 1, wherein the system further includes a database including criteria of a work history, number of overtime hours, an availability and qualifications of the each of the plurality of technicians, and suitable location to which the each of the plurality of technicians is the most beneficially dispatched.

3. The system of claim 1, wherein the system monitor additional request for service and requests to change service received before performance of the assignment, and
   when it is determined that the selected technician should be diverted from performing the assignment as a result from the additional requests or the requests to change service, the system communicates a scheduling change message to the selected technician before performance of the assignment.

4. The system of claim 3, wherein new assignments are generated for the additional requests for service.

5. A system for dispatching and notifying employees, comprising:
   a dispatch unit adapted to receive request for service;
   an access unit in communication with the dispatch unit, wherein the access unit is associated with an employee, the access unit providing access to information related to an infrastructure, and the access unit allowing the employee to run tests on a customer's equipment;
   a database including a number of hours, including overtime, the employee has worked in a pay period and locations in proximity to a geographic location to which the employee is assigned;
   a notifying unit in communication with the dispatch unit and the database; and
   a messaging unit in communication with the notifying unit,
   the dispatch unit receiving a first request for service, generating a work assignment, sending the work assignment to the employee, and monitoring additional requests for service or request to change service received after the first request, and
   when it is determined that modification of the work assignment is needed based on number of hours worked by the employee and a cancellation of the first request for service, the dispatch unit communicates appropriate information to the notifying unit, and the notifying unit locates the employee and provides real time adjustment information to the employee through the message unit, the real time adjustment instructing the employee to remain at current location for a next assignment.

6. The system of claim 5, the system including a plurality of access units, each of the plurality of the access units associated with each of a plurality of employees, and the database includes schedule information and qualifications of the plurality of employees.

7. The system of claim 6, wherein the dispatch unit generates the work assignment, matches the work assignment to one of the plurality of employees having availability and acceptable qualifications for performing the work assignment, and sends the work assignment to the of the plurality of employees.

8. A method for dispatching and notifying employees, comprising:
   receiving a first request for service;
   generating a work assignment in response to the first request of service;
   selecting an employee assigned to a geographic region that is proximate to a location associated with the first request for service;
   sending the work assignment to the employee;
   monitoring a second request for service received after the first request for service;
   analyzing the second request for service;
   receiving a cancelation of the first request for service;

determining a condition exists where i) the employee has been dispatched to the location associated with the work assignment and ii) a request has been received to modify the work assignment;

determining that real time intervention is required to modify the work assignment based on the number of hours worked, including overtime, by the employee in a pay period and based on the modification of the work assignment; and sending a cancelation code to the employee informing the employee that the work assignment has been canceled.

9. The method of 8, wherein selecting an employee includes matching the work assignment to one of a plurality of employees having availability and acceptable qualifications for performing the work assignment.

10. The method of 8, wherein the method further includes notifying the employee when it is determined that real time intervention is required.

11. A system for dispatching technicians comprising:
(a) a dispatch unit capable of receiving requests for service and generating work assignments associated with the requests; and
(b) an access unit, wherein the access unit is associated with a technician, the access unit providing access to information related to an infrastructure, and the access unit allowing the technician to run tests on a customer's equipment,
the dispatch unit receiving a first request for service, generating a work assignment, scheduling a technician to perform the work assignment, sending the work assignment to the technician assigned to a geographic region that is proximate to a location associated with the work assignment, receiving a cancelation of the work assignment, determining a condition exists where i) the technician has been dispatched to the location associated with the work assignment, ii) a request has been received to modify the work assignment, and iii) the request to modify the work assignment was received before performance of the work assignment, determining that real time intervention is required to modify the work assignment based on the number of hours worked, including overtime, by the employee in a pay period and based on the modification of the work assignment; and sending a cancelation code to the employee informing the employee that the work assignment has been canceled.

12. The system of claim 11, wherein when it is determined that the work assignment needs to be modified, the system communicates a modification message to the assigned technician before performance of the work assignment.

13. The system of claim 11, wherein the system further includes a notifying unit in communication with the dispatch unit.

14. The system of claim 13, wherein when it is determined that the work assignment needs to be modified, the dispatch unit forwards information related to modification of the work assignment to the notifying unit, and the notifying unit identifies the technician associated with the work assignment and communicates a modification message to the technician in real time.

* * * * *